US005890851A

United States Patent [19]

Hamilton

[11] Patent Number: 5,890,851

[45] Date of Patent: Apr. 6, 1999

[54] APPARATUS FOR INCREASING HAND DRILL PRESSURE

[76] Inventor: Robert Lloyd Hamilton, 8105—94 Street, Peace River, Alberta, Canada, T8S 1E8

[21] Appl. No.: 826,530

[22] Filed: Apr. 3, 1997

[30] Foreign Application Priority Data

Apr. 3, 1996 [CA] Canada .................................. 2173424

[51] Int. Cl.[6] ...................................................... B23B 47/00

[52] U.S. Cl. ............................ 408/136; 408/92; 408/110; 408/234

[58] Field of Search ............................. 408/92, 110, 111, 408/234, 136

[56] References Cited

U.S. PATENT DOCUMENTS

| | | | |
|---|---|---|---|
| 668,657 | 2/1901 | Nitschmann | 408/92 |
| 969,664 | 9/1910 | Sheetz | 408/92 |
| 1,097,709 | 5/1914 | Fosselman | 408/92 |
| 1,184,829 | 5/1916 | Crist | 408/92 |
| 1,333,743 | 3/1920 | Weiss | 408/136 |
| 3,248,973 | 5/1966 | Meyer | 408/92 |
| 3,784,315 | 1/1974 | O'Brien | 408/92 |
| 3,834,828 | 9/1974 | Kikuchi | 408/92 |
| 5,046,900 | 9/1991 | Heiter et al. | 408/84 |

*Primary Examiner*—Daniel W. Howell
*Assistant Examiner*—Adesh Bhargava
*Attorney, Agent, or Firm*—Anthony R. Lambert

[57] ABSTRACT

An apparatus for increasing hand drill pressure includes a lever having a first end and a second end. A sleeve is affixed transversely to the lever spaced from the first end. An anchor line is provided having a first end and a second end. The first end of the anchor line is secured to the first end of the lever. A hook is provided on the second end of the anchor line. The sleeve slides over a handle of a hand drill. The hook is used to anchor the anchor line to a workpiece. The lever provides a mechanical advantage to increase the pressure with which the hand drill engages the workpiece.

9 Claims, 2 Drawing Sheets

APPARATUS FOR INCREASING HAND DRILL PRESSURE

FIELD OF THE INVENTION

The present invention relates to an apparatus for increasing hand drill pressure.

BACKGROUND OF THE INVENTION

The advantage of applying pressure to a drill when drilling through a workpiece of wood or metal has long been recognized. Apparatus, commonly known as "drill presses", have been developed which support a drill with a depending drill bit above a workpiece and include press mechanisms which lower the drill, thereby forcing the drill bit into the workpiece during drilling operations. When manually drilling using a hand drill, a workman is prone to fatigue and muscle strain. This fatigue and muscle strain is exacerbated when the workman is working in a confined space or in an awkward position.

SUMMARY OF THE INVENTION

What is required is an apparatus for increasing hand drill pressure in a fashion similar to that of a drill press.

According to the present invention there is provided an apparatus for increasing hand drill pressure which includes a lever having a first end and a second end. Means is provided for pivotally attaching the lever to a hand drill spaced from the first end. An anchor line is provided having a first end and a second end. The first end of the anchor line is secured to the first end of the lever. Means is provided for anchoring the second end of the anchor line to a workpiece. The anchor line provides resistance to the lever pivoting about the hand drill when pressure is exerted upon the second end of the lever, the force pressing the hand drill into the workpiece exceeding the pressure exerted upon the second end of the lever.

The apparatus, as described above, provides a mechanical advantage which increases the force with which the hand drill is pressed toward the workpiece. A force exerted upon the second end of the lever translates to a multiple of that force at the hand drill. The multiple is dependent upon the length of the lever.

Once the underlying teaching of the invention is understood modifications can be made. The preferred means for anchoring the second end of the anchor line to the workpiece is a hook positioned on the second end of the anchor line. It will be appreciated that there are other means which can be used. The preferred means for pivotally attaching the hand drill to the lever includes a sleeve affixed transversely to the lever. It will, similarly, be appreciated that there are other means which can be used.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
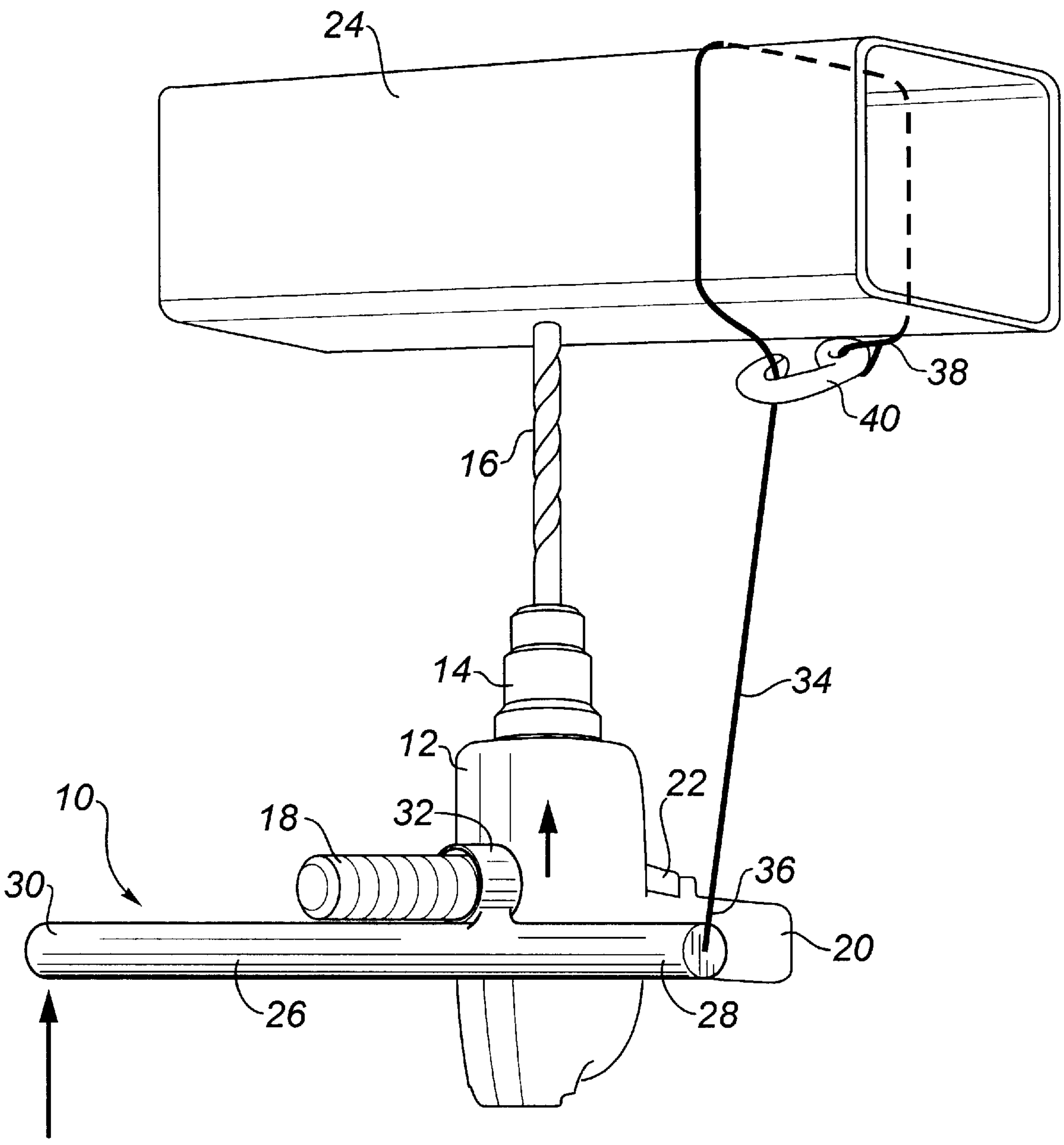
FIG. 1 is perspective view of an apparatus for increasing hand drill pressure constructed in accordance with the teachings of the present invention.

The preferred embodiment, an apparatus for increasing hand drill pressure generally identified by reference numeral 10, will now be described with reference to FIGS. 1 through 3.

Referring to FIG. 1 there is illustrated a hand drill 12 having a chuck 14 for receiving a drill bit 16. Hand drill 12, as illustrated, in one of the larger industrial models that has two handles 18 and 20. Both handles 18 and 20 are disposed substantially at right angles to chuck 14. Only handle 20 has a trigger 22. A workpiece to be drilled is illustrated in the form of a tubular member 24.

Apparatus 10 includes a lever 26 having a first end 28 and a second end 30. A sleeve 32 is affixed transversely to lever 26 spaced a short distance from first end 28. An anchor line 34 is provided having a first end 36 and a second end 38. First end 36 of anchor line 34 is secured to first end 28 of lever 26. A hook 40 is secured to second end 38 of anchor line 34.

The use and operation of apparatus 10 will now be described with reference to FIG. 1. Sleeve 32 slides over one of handles 18 or 20 of hand drill 12. In this case, handle 18 has been used to maximize access to trigger 22 on handle 20. By sliding sleeve 32 over handle 18, lever 26 is pivotally attached to hand drill 12. Second end 38 of anchor line 34 is wrapped around tubular member 24 and hook 40 engaged with anchor line 34. The drilling operation can now commence with hand pressure being applied to second end 30 of lever 26. Anchor line 34 provides resistance to lever 26 pivoting about handle 18 of hand drill 12 when pressure is exerted upon second end 30 of lever 26. With anchor line 34 preventing lever 26 from pivoting, the force applied to second end 30 of lever 26 exerts a force upon handle 18 pressing hand drill 12 toward tubular member 24. As drill bit 16 goes deeper into tubular member 24, pivotal movement of sleeve 32 about handle 18 allows lever 26 to change its position without adversely effecting the angle of entry of drill bit 16. The mechanical advantage provided by levers is well known. It will be understood that the force pressing hand drill 12 toward tubular member 24 exceeds the pressure exerted upon second end 30 of lever 26.

Figure 2:
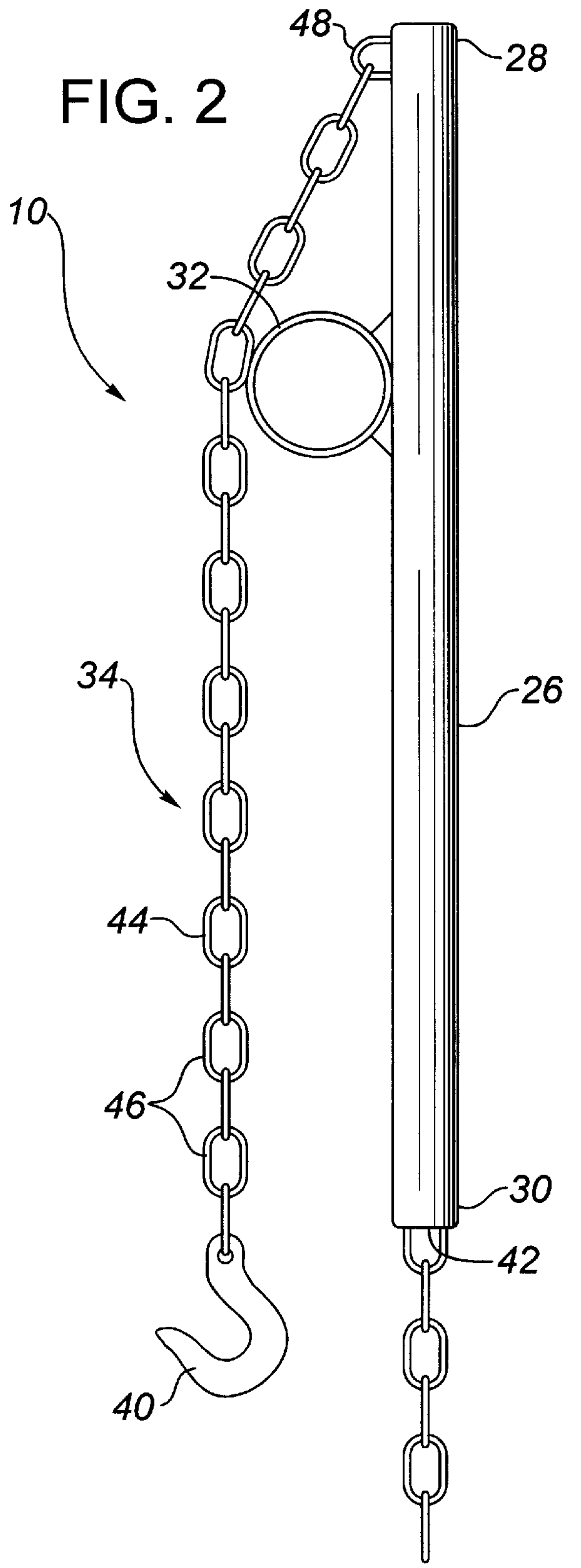
FIG. 2 is a side elevation view of an alternative embodiment of the invention.
Figure 3:
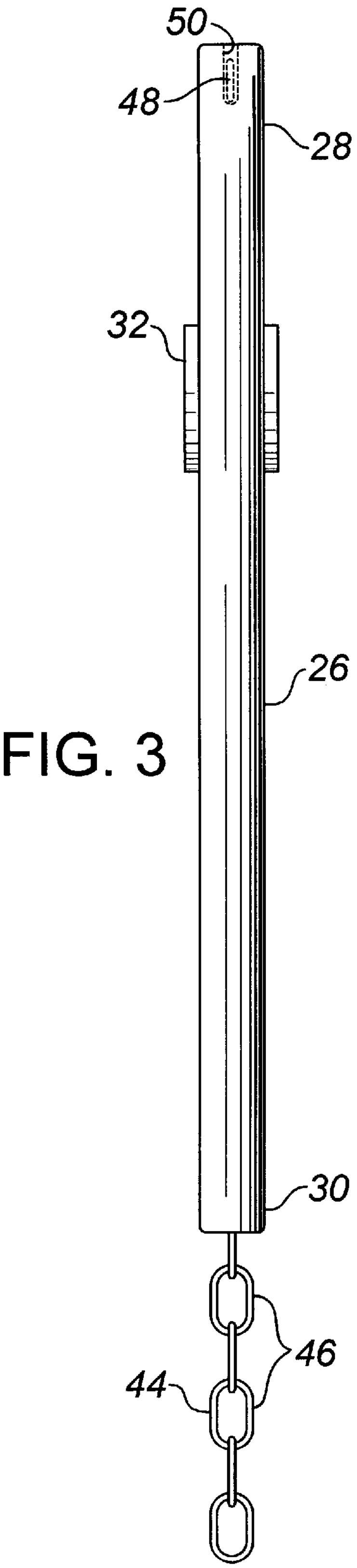
FIG. 3 is a front elevation view of the alternative embodiment illustrated in FIG. 2.

Referring to FIGS. 2 and 3, there is illustrated an alternative embodiment in which the length of anchor line 34 is adjustable. Referring to FIG. 2, lever 26 is tubular and, as a consequence, has a central bore 42. Anchor line 34 is fabricated from a chain 44 having a plurality of links 46. Chain 44 extends through central bore 42 of tubular lever 26. Referring to FIG. 3, a selected one 48 of plurality of links 46 of chain 44 is positioned in a slot 50 at first end 28 of lever 26. This secures anchor line 34 to first end 28 of lever 26 in a manner that enables the length of anchor line 34 to be adjusted.

It will be apparent to one skilled in the art that apparatus 10 is well suited for use by a workman working in confined spaces or in an awkward position. It will also be apparent to one skilled in the art that apparatus 10 shortens drilling time, reduces the effort required of the workman and lessens the possibility of muscle injury. It will finally be apparent to one skilled in the art that modifications may be made to the illustrated embodiment without departing from the spirit and scope of the invention as hereinafter defined in the Claims. There are a variety of materials suitable for use as anchor line 34; including a chain, wire cable, rope, and the like. Hand drill 12 could be manufactured with apparatus 10 "built in" to it's design. The length of lever 26 and the positioning of the fulcrum point are all matters of design choice.

The embodiment of the invention in which an exclusive property or privilege is claimed are defined as follows:

1. An apparatus for increasing hand drill pressure, comprising:

a lever having a first end and a second end;

a sleeve affixed transversely to the lever spaced from the first end whereby the lever may be pivotally attached to a handle of a hand drill;

an anchor line having a first end and a second end, the first end of the anchor line being secured to the first end of the lever;

means for anchoring the second end of the anchor line to a workpiece such that the anchor line provides resistance to the lever pivoting about the hand drill when an initial force is exerted upon the second end or the lever, thereby resulting in a resultant force pressing the hand drill into the workpiece that exceeds the initial force exerted upon the second end of the lever.

2. The apparatus as defined in claim 1, wherein the means for anchoring the second end of the anchor line to a workpiece includes a hook on the second end of the anchor line.

3. The apparatus as defined in claim 1, wherein means are provided for adjusting the length of the anchor line.

4. The apparatus as defined in claim 3, wherein the lever is tubular having a central bore, the anchor line is fabricated from a chain having a plurality of links, the anchor line passes through the central bore of the tubular lever, the means for adjusting the length of the anchor line being chain engaging means positioned at one of the first end and the second end of the lever.

5. An apparatus for increasing hand drill pressure, comprising:

a lever having a first end and a second end;

a sleeve affixed transversely to the lever spaced from the first end, whereby the lever may be pivotally attached to a handle of a hand drill;

an anchor line having a first end and a second end, the first end of the anchor line being secured to the first end of the lever; and a hook on the second end of the anchor line, whereby the second end of the anchor line is attached to a workpiece to provide resistance to the lever pivoting about the handle of the hand drill when an initial force is exerted upon the second end of the lever, resulting in a resultant force pressing the hand drill into the workpiece that exceeds the initial force exerted upon the second end of the lever.

6. The apparatus as defined in claim 5, wherein the lever is tubular having a central bore, the anchor line being fabricated from a chain having a plurality of links, the anchor line extending through the central bore of the tubular lever, a selected one of the plurality of links of the chain being positioned in a slot at the first end of the lever, thereby securing the anchor line to the first end of the lever in a manner that enables the length of the anchor line to be adjusted.

7. In combination:

a hand drill having a chuck for receiving a drill bit and a handle disposed at right angles to the chuck;

an apparatus for increasing hand drill pressure, comprising:

a lever having a first end and a second end;

a sleeve affixed transversely to the lever spaced from the first end, the sleeve sliding over the handle of the hand drill thereby pivotally attaching the lever to the hand drill;

an anchor line having a first end and a second end, the first end of the anchor line being secured to the first end of the lever;

means for anchoring the second end of the anchor line to a workpiece such that the anchor line provides resistance to the lever pivoting about the hand drill when pressure is exerted upon the second end of the lever, thereby resulting in a force pressing the hand drill into the workpiece that exceeds the pressure exerted upon the second end of the lever.

8. The combination as defined in claim 7, wherein a hook is positioned on the second end of the anchor line, the means for anchoring the second end of the anchor line to the workpiece including wrapping the anchor line around the workpiece with the hook engaging the anchor line.

9. An apparatus for assisting drilling with a hand drill, the apparatus comprising:

a lever having a fulcrum end and a handle end;

a transverse receptacle on the lever for receiving a handle of a hand drill, the receptacle being closer to the fulcrum end than to the handle end; and a tether having a first end secured to the fulcrum end and a free end.

* * * * *